(12) United States Patent
Long et al.

(10) Patent No.: US 10,412,461 B2
(45) Date of Patent: Sep. 10, 2019

(54) MEDIA STREAMING WITH LATENCY MINIMIZATION

(71) Applicant: Cable Television Laboratories, Inc., Louisville, CO (US)

(72) Inventors: Brendan Long, Rochester, MN (US); Darshak Thakore, Broomfield, MI (US)

(73) Assignee: Cable Television Laboratories, Inc., Louisville, CO (US)

(*) Notice: Subject to any disclaimer, the term of this patent is extended or adjusted under 35 U.S.C. 154(b) by 499 days.

(21) Appl. No.: 15/181,140

(22) Filed: Jun. 13, 2016

(65) Prior Publication Data
US 2016/0366488 A1 Dec. 15, 2016

Related U.S. Application Data

(60) Provisional application No. 62/174,544, filed on Jun. 12, 2015.

(51) Int. Cl.
| | |
|---|---|
| *H04N 21/61* | (2011.01) |
| *H04L 29/08* | (2006.01) |
| *H04L 29/06* | (2006.01) |
| *H04L 12/26* | (2006.01) |
| *G11B 27/10* | (2006.01) |
| *H04N 21/845* | (2011.01) |
| *H04N 21/2187* | (2011.01) |
| *H04N 21/2343* | (2011.01) |

(Continued)

(52) U.S. Cl.
CPC ......... *H04N 21/6125* (2013.01); *G11B 27/10* (2013.01); *H04L 43/0864* (2013.01); *H04L 65/602* (2013.01); *H04L 67/02* (2013.01); *H04N 21/2187* (2013.01); *H04N 21/23439* (2013.01); *H04N 21/26208* (2013.01); *H04N 21/4825* (2013.01); *H04N 21/8456* (2013.01)

(58) Field of Classification Search
CPC ... G11B 27/10; H04L 43/0864; H04L 65/602; H04L 67/02; H04N 21/6125; H04N 21/8456; H04N 21/2187; H04N 21/23439; H04N 21/26208; H04N 21/4825

See application file for complete search history.

(56) References Cited

U.S. PATENT DOCUMENTS

| | | | |
|---|---|---|---|
| 2013/0060956 A1* | 3/2013 | Nagaraj | H04N 21/4384 709/231 |
| 2013/0091251 A1* | 4/2013 | Walker | H04N 21/6125 709/219 |

(Continued)

OTHER PUBLICATIONS

DASH-IF Implementation Guidelines: Content Protection Information Exchange Format (CPIX), Jul. 17, 2015, DASH Industry Forum Version 1.0.

(Continued)

*Primary Examiner* — Michael C Lai
(74) *Attorney, Agent, or Firm* — Great Lakes Intellectual Property, PLLC

(57) ABSTRACT

Minimizing latency when streaming media, such as but not necessary limited to limiting or otherwise ameliorating polling latency, network response latency and/or other communication related latencies, is contemplated. The latency minimization may include facilitating long polling or otherwise facilitating instantaneously transmitting requested media once available.

20 Claims, 5 Drawing Sheets

(51) Int. Cl.
*H04N 21/262* (2011.01)
*H04N 21/482* (2011.01)

(56) References Cited

U.S. PATENT DOCUMENTS

| | | | | |
|---|---|---|---|---|
| 2014/0019587 A1* | 1/2014 | Giladi | ............... | H04L 29/06476 |
| | | | | 709/217 |
| 2015/0172733 A1* | 6/2015 | Tokumo | ............. | H04N 21/2387 |
| | | | | 725/93 |
| 2016/0198012 A1* | 7/2016 | Fablet | ................. | H04L 65/4084 |
| | | | | 709/231 |
| 2017/0111463 A1* | 4/2017 | Maze | ...................... | H04L 67/26 |

OTHER PUBLICATIONS

Prefer Header for HTTP, Internet Engineering Task Force (IETF), J. Snell, Request for Comments: 7240, Jun. 2014, Category: Standards Track ISSN: 2070-1721.

Information technology—Dynamic adaptive streaming over HTTP (DASH)—Part 1: Media presentation description and segment formats, International Standard ISO/IEC 23009-1, Second edition, May 15, 2014.

\* cited by examiner

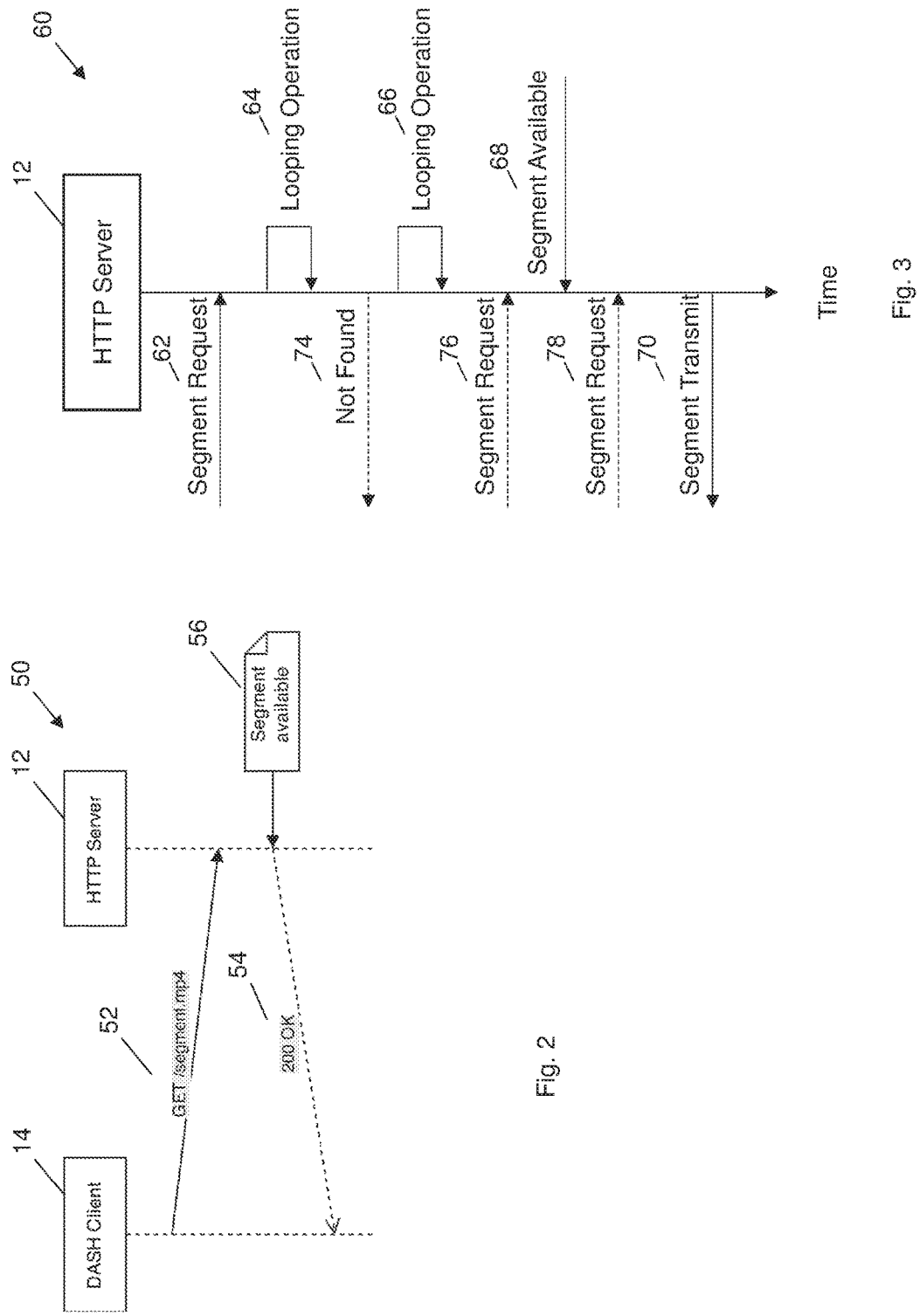

MEDIA STREAMING WITH LATENCY MINIMIZATION

CROSS-REFERENCE TO RELATED APPLICATIONS

This application claims the benefit of U.S. provisional Application No. 62/174,544 filed Jun. 12, 2015, the disclosure of which is incorporated in its entirety by reference herein.

TECHNICAL FIELD

The present invention relates to minimizing latency when streaming media, such as but not necessarily limited to limiting or otherwise ameliorating polling latency, network response latency and/or other communication related latencies.

BACKGROUND

Dynamic Adaptive Streaming over HTTP (DASH), such as that described in Part 1: Media presentation description and segment formats (ISO/IEC 23009-1, Second edition, 2014-05-15), the disclosure of which is hereby incorporated by reference in its entirety herein, relates to employing Hypertext Transfer Protocol (HTTP) to facilitate transferring media content components from a server to a client. DASH specifies Extensible Markup Language (XML) and binary formats that enable delivery of media content from HTTP servers to HTTP clients and enable caching of content by HTTP caches, such as in accordance with messaging and other processes described in Internet engineering task force (IETF) request for comment (RFC) 2616, the disclosure of which is hereby incorporated by reference in its entirety herein. DASH, as noted in the above identified specification, is intended to support a media-streaming model for delivery of media content components whereby clients may request data using the HTTP protocol from web servers, including those lacking DASH-specific capabilities.

While the present invention is not necessarily limited to DASH, DASH is representative of one distribution model susceptible to polling latency and/or network response latency. The polling latency is particularly evidenced when clients poll servers to check for new media segments, components and other information on a regular basis. The frequent polling can be problematic as the corresponding messaging and related processes can introduce latency when too infrequent and network overload when too frequent. The latency difficulties can be particularly problematic when media presentation descriptors (MPDs) utilized with DASH are dynamic, which is commonly the case for live television or other live content streaming, as dynamic MPDs require a client to poll the server until a new MPD is found, request newly available segments thereafter and then commence or continue playback thereafter once one or more of the segments have been sufficiently downloaded.

BRIEF DESCRIPTION OF THE DRAWINGS

FIG. 2 illustrates a diagram of facilitating media streaming with latency minimization in accordance with one non-limiting aspect of the present invention.

FIG. 3 illustrates a diagram of a server facilitating media streaming with latency minimization in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
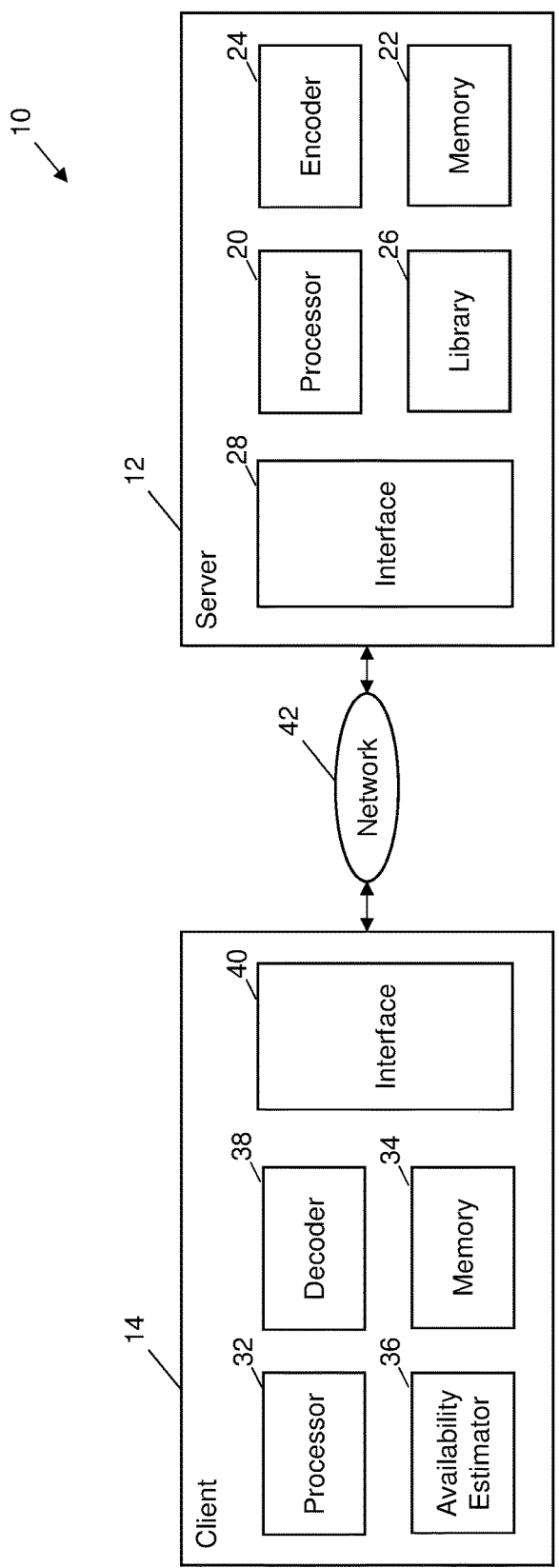
FIG. 1 illustrates a system for optimizing latency associated with media streaming in accordance with one non-limiting aspect of the present invention.

FIG. 1 illustrates a system 10 for optimizing latency associated with media streaming in accordance with one non-limiting aspect of the present invention. The processes and other operations associated with the system 10 are predominately described for exemplary purposes with respect to streaming media content components from a server 12 to a client 14, such as in accordance with DASH whereby an HTTP server streams media content components to DASH client. The media content components, which are interchangeably referred to herein as media, may be any type of content suitable for transmission in accordance with the present invention, such as video, audio, subtitles, files and the like, and is predominately described for exemplary non-limiting purposes as being video. The video may correspond with a television program, a movie, a personal recording, a videoconference or other arrangement having a plurality of images and/or audio to be presented in a particular sequence. One non-limiting aspect of the present invention contemplates the video being transmitted to the server 12 from a studio or other originator as a plurality of video frames whereupon the server 12 encodes and optimizes the video for subsequent transmission to the media clients.

The server 12 may include a processor 20 to facilitate the latency minimization operations and processes contemplated herein according to execution of corresponding non-transitory instructions stored within a non-transitory computer-readable medium or memory 22. The server 12 may include an encoder 24 or other device operable to receive the video frames and/or otherwise process or generate the media for streaming to the client 14. The server 12 is shown to include a library 26, which is called out for exemplary purposes as being independent of the memory 22, to demonstrate one non-limiting aspect of the present invention where the library 26 facilitates providing the media to the encoder 24 for subsequent encoding and transport and/or receiving encoded media from the encoder 24 for storage prior to subsequent transport. The library 26 may be included as part of the memory 22 or otherwise associated with the server 12 to facilitate transport of the media when determined to be available, such as once an associated segment, file, etc. is found in the library 26, when media is newly added/stored thereon and/or when other events take place indicating media being ready or available for transmission, e.g., a change to an existing media content component may trigger the library 26 or the functionality associated therewith to determine a need or capability to facilitate further streaming.

The encoding may generally correspond with the encoder 24 or other application compressing or processing the received video frames for transport, such as with the use of mechanisms and capabilities understood by one having ordinary skill in the art to facilitate the optimizations contemplated herein. The encoding may correspond with the encoding described in DASH whereby a particular video may be encoded to create a number of representations with the set of frames comprising each representation being variably compressed in order to maintain a constant bit rate throughout an entirety of the corresponding representation. The encoding may alternatively correspond with additional encoding described in DASH whereby the set of frames comprising each representation may be variably compressed in order to maintain a constant bit rate for the majority of the duration of the representation by allowing the bit rate to decrease for a minority of the representation, which may be referred to as a constrained variable bit rate approach. In either approach, each such representation may have some frames encoded at differing or varying resolution or quality in order for an entirety of the corresponding representation to be streamed at essentially a constant bit rate from start to finish. This type of constant bit rate encoding generally corresponds with the representations having a greater average bit rate providing higher quality video than the representations encoded at a lower average bit rate. The greater bit rates thus enable more data (bits) to be used in representing the original video so as to enable the video to be reproduced following decoding at a greater resolution or with other quality characteristics better than the lower bit rate encodings.

The use of such constant bit rate encodings may be useful when available bandwidth or other network restrictions or capabilities are unchanging during the duration of the video playback, and are a predominant factor in deciding which one of the representations is desired for access as the essentially unwavering bit rate enables media clients to simply select the representation having the maximum supportable bit rate. The use of such constant bit rate encodings may also be beneficial when generating metadata or other information used to facilitate the selection thereof as a single bit rate attribute can be assigned for an entirety of each representation. DASH, for example, utilizes a media presentation descriptor (MPD) to provide information associated with available representations within the MPD where a single bit rate or bandwidth attribute is assigned to each available representation, i.e., the number of bit rate or bandwidth attributes equals the number of representations. U.S. patent application Ser. No. 14/975,734, entitled Adaptive Streaming, the disclosure of which is hereby Incorporated by reference in its entirety herein, contemplates optimizing video streaming by similarly encoding the video into multiple representations but with each or some the corresponding representations instead having a constant quality and variable bit rate. The constant quality and variable bit rate contemplated therein may generally correspond with each frame or underlying portion of the media being encoded at bit rates necessary to maintain a desired spatial and/or temporal resolution and/or a desired distortion level throughout an entirety of the corresponding representation.

The constant quality encoding may result in the bit rates for a particular representation varying throughout the corresponding representation depending on the complexity of the corresponding frame or portion of video. While constant bit rate encodings may have some bit rate variations due to encoding tolerances or other inherent variables, those bit rate variations may be centered at a mean or average bit rate whereby the quality of the attendant portion of video is adjusted to maintain the constant bit rate. The constant quality encodings, in contrast, may be centered at a mean of average quality with the bit rate being unconstrained to any mean or average value whereby the bit rate of the attendant portion of video is adjusted as necessary to maintain the constant quality. The metric or measure of the constant quality encoding process may be based on spatial and/or temporal resolution or other quality metrics or levels such as the quantization parameter or quantizer coefficients. The maintenance of a constant quality may result in more complex video frames requiring a greater bit rate than less complex video frames as more bits may be required in order to represent the entirety of the underlying video at the same spatial and/or temporal resolution. The constant quality encoding process may be characterized with the bit rate continuously varying to maintain a constant quality whereas the constant bit rate encoding process may be characterized with the quality continuously varying to maintain a constant bit rate.

The server 12 may be configured to facilitate representing the encoding performed for any number of videos or media and supporting the streaming services associated therewith by creating and sharing suitable metadata with the client 14 or other clients in communication therewith. The metadata may match or partially corresponding with one or more DASH media presentation descriptors (MPDs) or virtually any file, document or other suitable construct having data or other syntax suitable for conveying information to the client necessary for parsing and accessing media encodings made available for transport from the server. One non-limiting aspect of the present invention contemplates use of the DASH MPD when representing video encoded according to the constant bit rate process and deviating from the DASH MPD when representing video encoded according to the constant quality process. The constant quality MPD or other metadata construct for the constant quality encodings may deviate insofar as including additional attributes, values, etc. sufficient to represent characteristics associated with the corresponding constant quality encoding process. Additional or different metadata may be generated to specify quality metrics for each representation, such as but not necessary limited to the attendant spatial and/or temporal resolution and/or a subjective quality index, and/or to specify bit rate variations for each representation, such as by including a number of attributes sufficient to at least indicate each significant bit rate variation (e.g., each bit rate change above a selectable threshold).

With respect to use of a DASH MPD to represent available services, the attendant metadata may include universal resource locators (URLs), XML schema and other variables, attributes, etc. used to identify available media and facilitate its delivery to a requesting media client using HTTP interactions or other suitable processes executed through a wireless and/or wireline interface 28 of the server 12. The server 12 may be configured to generate an MPD for each piece of available media or media presentation, e.g., the MPD may be generated for each television program, movie, video or other content available to the media clients. The MPD may describe a sequence of periods comprising a particular sequence of media forming a media presentation such that a period may be used to represent a media content period during which a constant set of encoded versions of the media is available, i.e. the set of available languages, captions, subtitles etc. may not change during the corresponding period. Within a period, material may be arranged into adaptation sets sufficient to represents a set of interchangeable encoded versions of one or several media content components.

There may be one adaptation set for the main video component and a separate one or more for a main audio component or other material available like captions or audio descriptions. Each adaptation set may contain a set of representations describing a deliverable or encoded version of one or several media content components. A representation may include one or more media streams (one for each media content component in the multiplex) sufficient to render the contained media content components. By collecting different representations in one adaptation set, the server 12 may express the corresponding representations as being equivalent content. The client 14 may dynamically switch from representation to representation within an adaptation set in order to adapt to network conditions or other factors, e.g., switching refers to the presentation of decoded data up to a certain time t, and presentation of decoded data of another representation from time t onwards. Within a representation, the media may be divided in time into the segments for proper accessibility and delivery. In order to access a segment, a URL may be provided for each segment operable to facilitate corresponding HTTP requests. A segment may be the smallest unit of data that can be retrieved and independently decoded by the client with a single HTTP request and/or a byte range with the URL indicating the segment is contained in the provided byte range of some larger resource. Segments may be each assigned a duration corresponding with presentation of the media contained in the segment when played at normal speed. All Segments in a representation may have the same or roughly similar duration with the last segment optionally differing.

An MPD in compliance with DASH may include metadata sufficient to represent the various tables and attributes associated therewith, which are incorporate by reference in their entirety herein. A portion of the tables having attributes representative of those contemplated to facilitate minimizing latency in accordance with the present invention a presented below for exemplary, non-limiting purposes.

TABLE 3

Semantics of MPD element

| Element or Attribute Name | Use | Description |
| --- | --- | --- |
| MPD | | The root element that carries the Media Presentation Description for a Media Presentation. |
| @id | O | specifies an identifier for the Media Presentation. It is recommended to use an identifier that is unique within the scope in which the Media Presentation is published. If not specified, no MPD-internal identifier is provided. However, for example the URL to the MPD may be used as an identifier for the Media Presentation. |
| @profiles | M | specifies a list of Media Presentation profiles as described in 8. The contents of this attribute shall conform to either the pro-simple or pro-fancy productions of RFC6381. Section 4.5, without the enclosing DQUOTE characters, i.e, including only the unencodedy or encodedy elements respectively. As profile identifier the URI defined for the conforming Media Presentation profiles as described in 8 shall be used. |
| @type | OD default: static | specifies the type of the Media Presentation. For static Media Presentations (#type = "static") all Segments are available between the @availabilityStartTime and the @availabilityEndTime. For dynamic Media Presentations (@type = "dynamic") Segments typically have different availability times. For details refer to 5.3.9.5.3. In addition the Media Presentation Description may be updated in dynamic Media Presentations, i.e. the @mininumUpdatePeriod may be present. NOTE Static Media Presentations are typically used for On-Demand services, whereas dynamic Media Presentations are used for live services. |
| @availabilityStartTime | CM Must be present for @type = 'dynamic' | For @type = 'dynamic' this attribute shall be present. In this case it specifies the anchor for the computation of the earliest availability time (in UTC) for any Segment in the Media Presentation. For @type = "static" if present, it specifies the Segment availability start time for all Segments referred to in this MPD. If not present, all Segments described in the MPD shall become available at the time the MPD becomes available. |
| @publishTime | OD Must be present for @type = 'dynamic' | specifies the wall-clock time when the MPD was generated and published at the origin server. MPDs with a later value of @publishTime shall be an update as defined in 5.4 to MPDs with earlier @publishTime. |

TABLE 3-continued

Semantics of MPD element

| Element or Attribute Name | Use | Description |
|---|---|---|
| @availabilityEndTime | O | specifies the latest Segment availability end time for any Segment in the Media Presentation. When not present, the value is unknown. |
| @mediaPresentationDuration | O | specifies the duration of the entire Media Presentation. If the attribute is not present, the duration of the Media Presentation is unknown. This attribute shall be present when neither the attribute MPD@minimumUpdatePeriod nor the Period@duration of the last Period are present. |
| @minimumUpdatePeriod | O | If this attribute is present, it specifies the smallest period between potential changes to the MPD. This can be useful to control the frequency at which a client checks for updates. If this attribute is not present it indicates that the MPD does not change. If MPD@type is 'static'. @minimumUpdatePeriod shall not be present. Details on the use of the value of this attribute are specified in 5.4. |
| @minBufferTime | M | specifies a common duration used in the definition of the Representation data rate (see @bandwidth attribute in 5.3.5.2). |
| @timeShiftBufferDepth | O | specifies the duration of the smallest time shifting buffer for any Representation in the MPD that is guaranteed to be available for a Media Presentation with type 'dynamic'. When not present, the value is infinite. This value of the attribute is undefined if the type attribute is equal to 'static'. |
| @suggestedPresentationDelay | O | when @type is 'dynamic', it specifies a fixed delay offset in time from the presentation time of each access unit that is suggested to be used for presentation of each access unit. For more details refer to 7.2.1. When not specified, then no value is provided and the client is expected to choose a suitable value. when @type is 'static' the value of the attribute is undefined and may be ignored. |
| @maxSegmentDuration | O | specifies the maximum duration of any Segment in any Representation in the Media Presentation, i.e. documented in this MPD and any future update of the MPD. If not present, then the maximum Segment duration shall be the maximum duration of any Segment documented in this MPD. |
| @maxSubsegmentDuration | O | specifies the maximum duration of any Media Subsegment in any Representation in the Media Presentation. If not present, the same value as for the maximum Segment duration is implied. |
| ProgramInformation | 0 . . . N | specifies descriptive information about the program. For more details refer to the description in 5.7. |
| BaseURL | 0 . . . N | specifies a Base URL that can be used for reference resolution and alternative URL selection. For more details refer to the description in 5.6. |
| Location | 0 . . . N | specifies a location at which the MPD is available. |
| Period | 1 . . . N | specifies the information of a Period. For more details refer to the description in 5.3.2. |
| Metrics | 0 . . . N | specifies the DASH Metrics. For more details see 5.9. |
| EssentialProperty | 0 . . . N | specifies information about the containing element that is considered essential by the Media Presentation author for processing the containing element. For details see 5.8.4.8. |
| SupplementalProperty | 0 . . . N | specifies supplemental information about the containing element that may be used by the DASH client optimizing the processing. For details see 5.8.4.9. |
| UTCTiming | 0 . . . N | specifies information on ways to obtain a synchronization to wall-clock time as used in this Media Presentation. The order of the elements expresses a preference of choice by the Media Presentation author. For more details refer to 5.8.4.11. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @

TABLE 4

Semantics of period element

| Element or Attribute Name | Use | Description |
|---|---|---|
| Period | | specifies the information of a Period. |
| @xlink:href | O | specifies a reference to a remote element entity that is either empty or contains one or multiple top-level elements of type Period |
| @xlink:actuate | OD default: onRequest | specifies the processing instructions, which can be either "onLoad" or "onRequest". This attribute shall not be present if the @xlink:href attribute is not present. |
| @id | O | specifies an identifier for this Period. The identifier shall be unique within the scope of the Media Presentation. If the MPD@type is "dynamic", then this attribute shall be present and shall not change in case the MPD is updated. If not present, no identifier for the Period is provided. |
| @start | O | if present, specifies the PeriodStart time of the Period. The PeriodStart time is used as an anchor to determine the MPD start time of each Media Segment as well as to determine the presentation time of each access unit in the Media Presentation timeline. If not present, refer to the details in 5.3.2.1. |
| @duration | O | if present specifies the duration of the Period to determine the PeriodStart time of the next Period. If not present, refer to the details in 5.3.2.1. |
| @bitstreamSwitching | OD Default: false | When set to 'true', this is equivalent as if the AdaptationSet@bitstreamSwitching for each Adaptation Set contained in this Period is set to 'true'. In this case, the AdaptationSet@bitstreamSwitching attribute shall not be set to 'false' for any Adaptation Set in this Period. |
| BaseURL | 0 ... N | specifies a base URL that con be used for reference resolution and alternative URL selection. For more details refer to the description in 5.6. |
| SegmentBase | 0 ... 1 | specifies default Segment Base information. Information in this element is overridden by information in AdaptationSet.SegmentBase and Representation.SegmentBase, if present. For more details see 5.3.9. |
| SegmentList | 0 ... 1 | specifies default Segment List information. Information in this element is overridden by information in AdaptationSet.SegmentList and Representation.SegmentList, if present. For more details see 5.3.9. |
| SegmentTemplate | 0 ... 1 | specifies default Segment Template information. Information in this element is overridden by information in AdaptationSet.SegmentTemplate and Representation.SegmentTemplate, if present. For more details see 5.3.9. |
| AssetIdentifier | 0 ... 1 | specifies that this Period belongs to a certain asset. For more details see 5.8.5.7. |
| EventStream | 0 ... N | specifies an event stream. For more details see 5.10.2. |
| AdaptationSet | 0 ... N | specifies an Adaptation Set. At least one Adaptation Set shall be present in each Period unless the value of the @duration attribute of the Period is set to zero. For more details see 5.3.3. |
| Subset | 0 ... N | specifies a Subset. For more details see 5.3.8. |
| SupplementalProperty | 0 ... N | specifies supplemental information about the containing element that may be used by the DASH client optimizing the processing. For details see 5.8.4.9.. |

Legend:
For attributes: M = Mandatory. O = Optional. OD = Optional with Default Value, CM = Conditionally Mandatory.
For elements: <minOccurs> ... <maxOccurs> (N = unbounded)
Note
that the conditions only holds without using xlink:href. If linking is used, then all attributes are "optional" and <minOccurs = 0>
Elements are bold; attributes are non-bold and preceded with an @.

TABLE 11

Semantics of SegmentBase element and Segment Base Information type

| Element or Attribute Name | Use | Description |
|---|---|---|
| SegmentBase <br> Segment Base Information | | specifies Segment base element. <br> This element also specifies the type for the Segment base information that is the base type for other elements. |
| @timescale | O | specifies the timescale in units per seconds to be used for the derivation of different real-time duration values in the Segment Information. <br> If not present on any level, it shall be set to 1. <br> NOTE: <br> This may be any frequency but typically is the media clock frequency of one of the media streams (or a positive integer multiple thereof). |
| @presentationTimeOffset | O | specifies the presentation time offset of the Representation relative to the start of the Period, i.e. the presentation time value of the media stream that shall be presented at the start of this Period. <br> The value of the presentation time offset in seconds is the division of the value of this attribute and the value of the @timescale attribute. <br> If not present on any level, the value of the presentation time offset is 0. |
| @timeShiftBufferDepth | O | specifies the duration of the time shifting buffer for this Representation that is guaranteed to be available for a Media Presentation with type 'dynamic'. When not present, the value is of the @timeShiftBufferDepth on MPD level applies. If present, this value shall be not smaller than the value on MPD level. This value of the attribute is undefined if the type attribute is equal to 'static'. <br> NOTE: <br> When operating in a time-shift buffer on a Representation with value larger than the time-shift buffer than signalled cn MPD level, not all Representations may be available for switching. |
| @indexRange | O | specifies the byte range that contains the Segment Index in all Media Segments of the Representation. <br> The byte range shall be expressed and formatted as a byte-range-spec as defined in RFC 2616, Clause 14.35.1. It is restricted to a single expression identifying a contiguous range of bytes. <br> If not present the value is unknown. |
| @indexRangeExact | OD default "false" | when set to 'true' specifies that for all Segments in the Representation, the data outside the prefix defined by @indexRange contains the data needed to access all access units of all media streams syntactically and sematically. <br> This attribute shall not be present if @indexRange is absent. |
| @availabilityTimeOffset | O | specifies an offset to define the adjusted segment availability time. The value is specified in seconds, possibly with arbitrary precision. <br> The offset provides the time how much earlier these segments are available compared to their computed availability start time for all Segments of all associated Representation. <br> The segment availability start time defined by this value is referred to as adjusted segment availability start time. For details on computing the adjusted segment availability start time, refer to 5.3.9.5. <br> If not present, no adjusted segment availability start time is defined. <br> NOTE: <br> the value of "INF" implies availability of all segments starts at MPD@availabilityStartTime. |

TABLE 11-continued

Semantics of SegmentBase element and Segment Base Information type

| Element or Attribute Name | Use | Description |
| --- | --- | --- |
| @availabilityTimeComplete | O | specifies if all Segments of all associated Representation are complete at the adjusted availability start time. The attribute shall be ignored if @availabilityTimeOffset is not present on any level.<br>If not present on any level, the value is inferred to true.<br>NOTE:<br>If the value is set to false, then it may be inferred by the client that the segment is available at its announced location prior being complete. |
| Initialization | 0 . . . 1 | specifies the URL including a possible byte range for the Initialization Segment.<br>For the type definition refer to Table 13. |
| RepreaentationIndex | 0 . . . 1 | specifies the URL including a possible byte range for the Representation Index Segment.<br>For the type definition refer to Table 13. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

TABLE 12

Semantics of MultipleSegmentBaseInformation type

| Element or Attribute Name | Use | Description |
| --- | --- | --- |
| MultipleSegmentBaseInformation | | specifies multiple Segment base information. |
| @duration | O | If present, specifies the constant approximate Segment duration.<br>All Segments within this Representation element have the same duration unless it is the last Segment within the Period, which could be significantly shorter.<br>The value of the duration in seconds is the division of the value of this attribute and the value of the @timescale attribute associated to the containing Representation.<br>For more details refer to 5.3.9.5.3. |
| @startNumber | O | specifies the number of the first Media Segment in this Representation in the Period.<br>For details refer to 5.3.9.5.3. |
| Segment Base Information | | specifies Segment base information. |
| SegmentTimeline | 0 . . . 1 | specifies the timeline of arbitrary Segment durations<br>For more details see 5.3.9.6. |
| BitstreamSwitching | 0 . . . 1 | specifies the URL including a possible byte range for the Bitstream Switching Segment.<br>For the type definition refer to Table 13. |

Legend:
For attributes: M = Mandotory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

TABLE 13

Semantics of elements of type URLType

| Element or Attribute Name | Use | Description |
| --- | --- | --- |
| Element of type URLType | | defines an HTTP-URL |
| @sourceURL | O | specifies the source URL part and shall be formatted either as an <absolute-URI> according to RFC 3986, Clause 4.3, with a fixed scheme of "http" or "https" or as a <relative-ref> according to RFC 3986, Clause 4.2. |

TABLE 13-continued

Semantics of elements of type URLType

| Element or Attribute Name | Use | Description |
|---|---|---|
| | | If not present, then any BaseURL element is mapped to the @sourceURL attribute and the range attribute shall be present. |
| @range | O | specifies the byte range restricting the above HTTP-URL. The byte range shall be expressed and formatted as a byte-range-spec as defined in RFC 2616, Clause 14.35.1. It is restricted to a single expression identifying a contiguous range of bytes. If not present, the element refers to the entire resource referenced in the @sourceURL attribute. |

TABLE 16

Identifiers for URL templates

| $<Identifiers>$ | Substitution parameter | Format |
|---|---|---|
| $$ | Is an escape sequence, i.e. "$$" is replaced with a single "$" | not applicable |
| $RepresentationID$ | This identifier is substituted with the value of the attribute Representation@id of the containing Representation. | The format tag shall not be present. |
| $Number$ | This identifier is substituted with the number of the corresponding Segment. | The format tag may be present. If no format lag is present, a default format tag with width = 1 shall be used. |
| $Bandwidth$ | This identifier is substituted with the value of Representation@bandwidth attribute value. | The format tag may be present. If no format tag is present, a default format tag with width = 1 shall be used. |
| $Time$ | This identifier is substituted with the value of the SegmentTimeline@t attribute for the Segment being accessed. Either $Number$ or $Time$ may be used but not both at the same time. | The format tag may be present. If no format tag is present, a default format tag with width = 1 shall be used. |

TABLE 17

Semantics of SegmentTimeline element

| Element or Attribute Name | Use | Description |
|---|---|---|
| SegmentTimeline | | specifies the Segment timeline information |
| S | 1 . . . N | specifies Segment start time and duration for a contiguous sequence of segments of identical durations. The textual order of the s elements must match the indexed (and thus time) order of the corresponding Media Segments. |
| @t | O | specifies the MPD start time, in @timescale units, the first Segment in the series starts relative to the beginning of the Period. The value of this attribute must be equal to or greater than the sum of the previous s element earliest presentation time and the sum of the contiguous Segment durations. If the value of the attribute is greater than what is expressed by the previous s element, it expresses discontinuities in the timeline. If not present then the value shall be assumed to be zero for the first s element and for the subsequent S elements, the value shall be assumed to be the sum of the previous S element's earliest presentation time and contiguous duration (i.e. previous s@t + @d * (@r + 1)). |
| @n | O | specifies the Segment number of the first Segment in the series. The value of this attribute must be at least one greater than the number of previous S elements plus the |

TABLE 17-continued

Semantics of SegmentTimeline element

| Element or Attribute Name | Use | Description |
|---|---|---|
| | | @startNumber attribute value, if present. If the value of @n is greater than one plus the previously calculated Segment number, it expresses that one or more prior Segments in the timeline are unavailable. |
| @d | M | specifies the Segment duration, in units of the value of the @timescale. |
| @r | OD default: 0 | specifies the repeat count of the number of following contiguous Segments with the same duration expressed by the value of @d. This value is zero-based (e.g. a value of three means four Segments in the contiguous series). A negative value of the @r attribute of the S element indicates that the duration indicated in @d attribute repeats until the start of the next S element, the end of the Period or until the next MPD update. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

TABLE 19

Semantics of BaseURL element

| Element or Attribute Name | Use | Description |
|---|---|---|
| BaseURL | | A URL that can be used as Base URL. The content of this element is a URI string as described in 5.6.4. |
| @serviceLocation | O | This attribute specifies a relationship between Base URLs such that BaseURL elements with the same @serviceLocation value are likely to have their URLs resolve to services at a common network location, for example a common Content Delivery Network. If not present, no relationship to any other Base URL is known. |
| @byteRange | O | if present specifies HTTP partial GET requests may alternatively be issued by adding the byte range into a regular HTTP-URL based on the value of this attribute and the construction rules in Annex E.2. If not present, HTTP partial GET requests may not be converted into regular GET requests. NOTE Such alternative requests are expected to not be used unless the DASH application requires this. For more details refer to Annex E. |
| @availabilityTimeOffset | O | specifies an offset to define the adjusted segment availability time. For semantics, refer to Table 11. If the value is present in SegmentBase then this attribute should not be present. If present in SegmentBase and BaseURL the value in BaseURL shall be ignored. |
| @availabilityTimeComplete | O | specifies if all Segments of all associated Representation are complete at the adjusted availability start time. For semantics, refer to Table 11. If the value is present in SegmentBase then this attribute should not be present. If present in SegmentBase and BaseURL the value in BaseURL shall be ignored. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

The foregoing tables and the attributes associated therewith, as well as the other tables and attributes defined in DASH that are not reproduced above but contemplated for use in accordance with the present invention, may be generally defined as a plurality of availability attributes sufficient for use with the client 14 in determining, selecting, accessing and otherwise facilitating determining availability of streaming services from the server. One non-limiting aspect of the present invention contemplates the client 14 processing the availability attributes to facilitate minimizing latency so as to provide improved access to services across devices, which may be particularly beneficial in facilitating an "any device" experience on tablets, phones, computers or other non-television devices that closely aligns with a viewing experience commonly associated with televisions. The above-described polling latency, i.e., the latency associated with clients 14 polling or otherwise requesting media too frequently or infrequently, may be ameliorated in accordance with the present invention by long polling the server 12 or otherwise interacting with the server 12 in advance of media being available for streaming so that the media can be more quickly streamed once it becomes available, e.g., without delay associated with clients 14 requesting media after the media becomes available. The client 14 may be configured in accordance with the present invention to facilitate the long polling by performing calculations and corresponding communications on a segment-by-segment basis dependent on segment availability.

DASH notes an available segment as one that is accessible at its assigned HTTP-URL (and a possibly assigned byte range) that can be requested by the client with an HTTP GET, resulting in a reply having the segment and an HTTP 2xx status code. The noted tables may be utilized to indicate a timeline generated to signal to clients 14 the availability time of segments at the specified HTTP-URLs, which the corresponding times may referred to as segment availability times (provided in Coordinated Universal Time (UTC) values and/or wall-clock time values). In the absence of long polling, the client may transmit a request once or after the wall-clock time matches with the corresponding segment availability times at the specified HTTP-URLs in order to avoid erroneous HTTP request responses. For static Media Presentations, the availability times of all Segments are identical. For dynamic Media Presentations, the availability times of segments depend on the position of the segment in the media presentation timeline, i.e. the segments become available over time. Whereas static media presentations are suitable to offer On-Demand content, dynamic media presentations are mostly suitable to offer live services. Specifically, a segment may be referenced by an HTTP-URL included in the MPD, where an HTTP-URL is defined as an <absolute-URI> according to RFC 3986, the disclosure of which is hereby Incorporated by reference in its entirety, whereby each Segment referenced through an HTTP-URL in the MPD is associated with a segment availability interval, i.e. a time window in wall-clock time at which the segment can be accessed via the HTTP-URL. The segment availability interval window may be reference with the availability attributes according to a segment availability start time and a segment availability end time.

The client 14 may be configured to facilitate assessing segment availability for purposes of facilitating the latency minimization operations and processes contemplated with a processor 32 executing according to non-transitory instructions stored within a non-transitory computer-readable medium or memory 34. The client 14 related processes for estimating segment availability are illustrated for exemplary purposes as being associated with an availability estimator 36 to highlight capability of the present invention to perform operations outside of those defined within DASH. The availability estimator 36 may be configured to facilitate latency minimization by estimating segment availability and thereafter facilitating segment requests prior to the corresponding segments being available from the server 12. The client 14 may include a decoder 38 or other device operable to process the request is segments when streamed thereto through a corresponding wireless and/or wired interface 40. A network 42 associated with a service provider, Internet service provider, cellular provider or other data provider may be configured to facilitate communicating messages, segments, and other information between the client and server, optionally according to HTTP or other suitable communication protocol.

FIG. 2 illustrates a diagram 50 of facilitating media streaming with latency minimization in accordance with one non-limiting aspect of the present invention. The diagram 50 illustrates the exemplary scenario where the client 14 transmits, e.g., according to instructions provided from the availability estimator 36, a segment requests 52 to the server 12 prior to the corresponding segment being available for streaming. The availability estimator 36 may process availability attributes and/or other metadata included within the MPD or otherwise provided from the server 12 or entity associated therewith to assess when a desired segment is indicated in the MPD as being available. The estimator 36 may thereafter facilitate transmission of the corresponding request message 52 such that the request message arrives at the server 12 prior to the actual availability of the desired segment. The server 12 may be configured in accordance with the present invention to receive the corresponding request message 52 and thereafter transmit a response message 54 having the requested segment once a server process 56 determines the segment actual becomes available, e.g., at or after the segment availability indicated in the MPD.

The capability of the present invention to transmit the request message 52 to the server 12 prior to the availability time indicated in the MPD, and the configuration of the server 12 to process the request without issuing a not-found message or otherwise ignoring its receipt, enables the transmission of the requested segment as soon as it becomes available at the server 12. The availability estimator 36 may be configured to adjust the segment availability indicated in the MPD according to a long-polling factor or other variable sufficient to adjust the timing associated therewith to enable a corresponding request message to be transmitted from the client 14 for arrival at the server 12 prior to actual or true availability of the segment. The long-polling factor may be a design parameter selected by a system operator or other entity tasked with facilitating the streaming services and/or dynamically determined as a function of client/server operations or network considerations. One non-limiting aspect of the present invention contemplates the availability estimator 36 determining a round-trip time (RTT) for messages traveling between the client 14 and the server 12 and adjusting transmission of segment request messages as a function thereof so as to ensure arrival at the server 12 before the corresponding segment(s) are available.

FIG. 3 illustrates a diagram 60 of the server 12 facilitating media streaming with latency minimization in accordance with one non-limiting aspect of the present invention. The diagram 50 illustrates the server 12 receiving a segment request message 62 from a client desiring streaming of a particular segment and thereafter executing one or more looping operations 64, 66 until a determination of segment availability 68 is made whereupon a message 70 may be transmitted to deliver the requested segment. The determination of segment availability 68 may correspond with a point in time corresponding with the segment availability indicated within the corresponding MPD, or if additional latencies occur at the server 12 or otherwise influence operation thereof, at some point after the time indicated in the MPD. The looping operations 64, 66 relate to operations and processes at the server 12 associated with checking for availability of the requested segment. In the exemplary illustration of the server 12 having the library, segments may be determined to be available as soon as the library 26 receives a file having a filename matching the segment identifier or other filename included within the segment request message 62. The segment request message 62 may optionally include a timeout variable or header indicating a period of time during which the server 12 is to check for the requested segment, e.g., the number and/or duration of the looping operations.

A not-found message 74 is shown in dashed lines as an optional process whereby the server transmits an HTTP 404 message or other suitable message to indicate unavailability of the requested segment. The not-found message 74 is illustrated for exemplary non-limiting purposes as being transmitted after the first looping operation 64 due to the optional timeout variable specifying a check or wait period less than that needed for the segment to become available, which may result from the server 12 experiencing latency sufficient to cause the segment availability determination to occur later in time than that indicated in the MPD or estimated with the availability estimator 36 and/or in the event the timeout variable is too short. The client 14 may process the not-found message 74 and thereafter re-transmit or otherwise re-request streaming of the desired segment with another request message 76, such as with issuance of the same segment request message 62, optionally with a timeout variable changed or removed if previously included, which depending on timing may be received at the server 12 before the segment actually becomes available or thereafter as the request message 78. In this manner, the present invention contemplates the client 14 attempting to long poll the server 12 initially, and in the event of the failure thereof, enabling the client 14 to subsequently obtain the desired segment either with continued long polling with the pre-availability request message or non-long polling with the post-availability request message.

Figure 4:
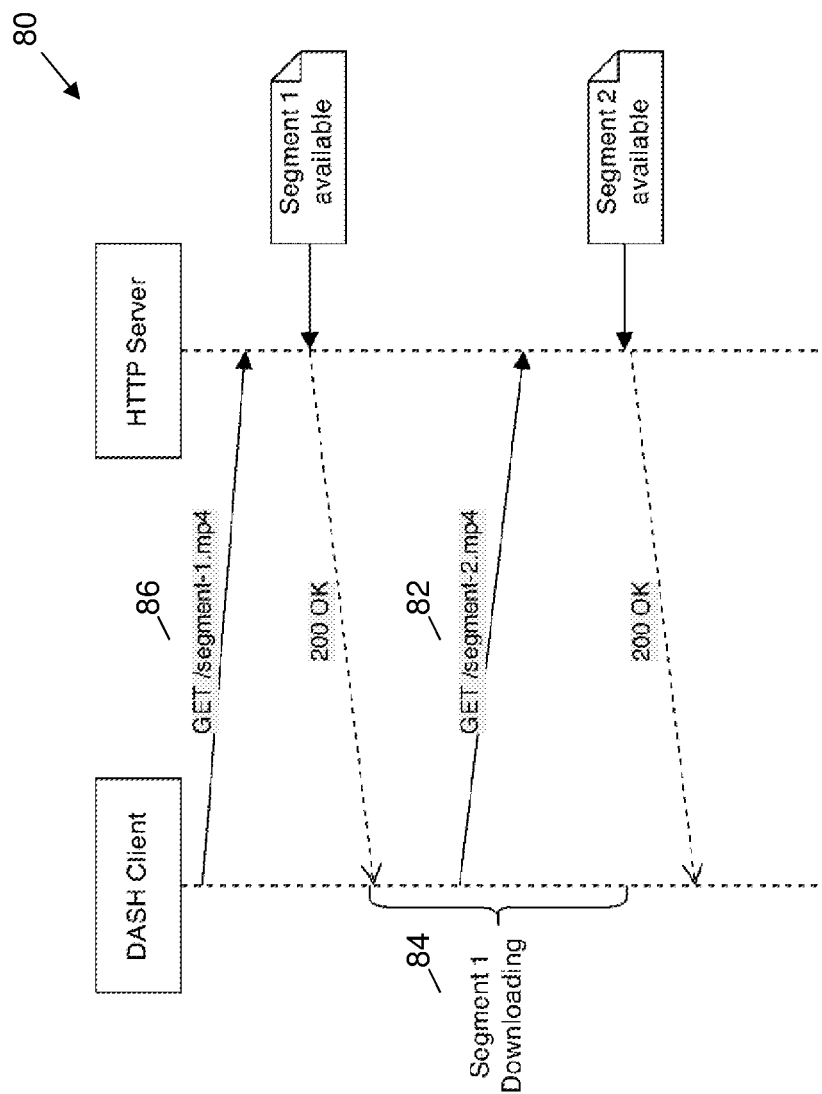
FIG. 4 illustrates a diagram of facilitating pipeline streaming with latency minimization in accordance with one non-limiting aspect of the present invention.

FIG. 4 illustrates a diagram 80 of facilitating pipeline streaming with latency minimization in accordance with one non-limiting aspect of the present invention. The diagram illustrates pipeline streaming whereby the client 14 issues a segment request message 82 while still executing a downloading operation 84 associated with a segment requested in a previous request message 86. The pipeline streaming may be beneficial in enabling the client 14 to continuously long poll the server for desired segments, particularly when the download associated therewith is slow, so as to facilitate a continuous or uninterrupted user experience. As shown, the request messages 82, 86 include different filenames for indicating the segment being requested. While not described in detail above, the availability attributes included in the MPD may be utilized to facilitate determining individual segment filenames, addresses, URLs, etc. necessary to request the download thereof. One non-limiting aspect of the event present invention contemplates generating the MPD to include predictable segment names or filenames, such as by the availability estimator using the $Number$ attribute noted above to derive individual segment names for each segment being requested.

Figure 5:
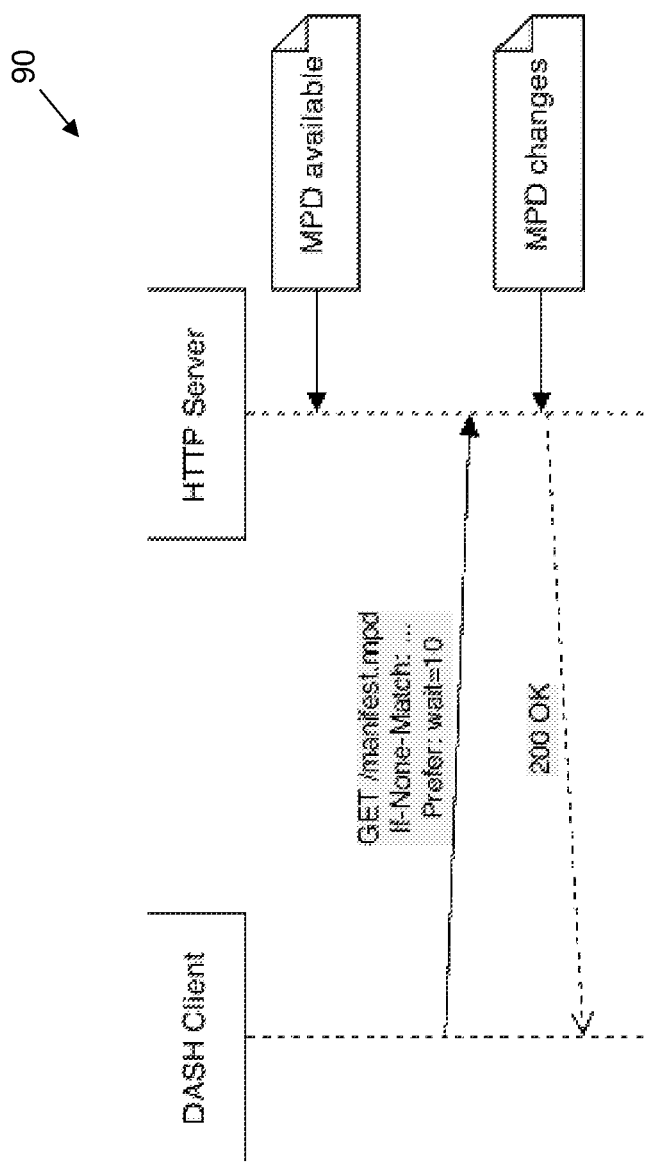
FIG. 5 illustrates a diagram of facilitating ETag streaming with latency minimization in accordance with one non-limiting aspect of the present invention.

FIG. 5 illustrates a diagram 90 of facilitating ETag streaming with latency minimization in accordance with one non-limiting aspect of the present invention. The ETags may be utilized to facilitate long polling the server MPDs whereby an ETag can be generated upon downloading an MPD for purposes of automatically downloading a new MPD when changes occur therein.

ETag Example:
GET/dash/mpd.xml
Timeout: 5000
If-None-Match: W/"52d77-3355156460"
Server Handling
1. If the server does not understand these headers, it responds as usual (200, 304, or 404).

2. When the file becomes available or updates:
The server:
i. generates an etag.
ii. If the etag doesn't match the "If-None-Match" header, the server sends a 200 response.
3. If the timeout expires, the server responds as usual (200, 304 or 404).

Figure 6:
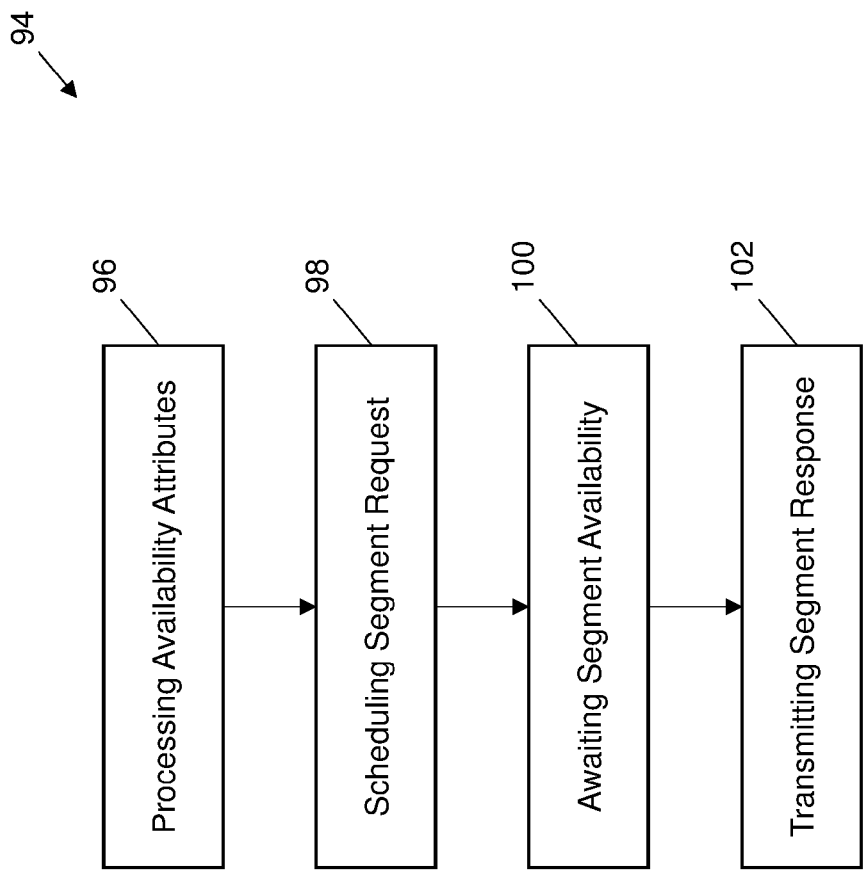
FIG. 6 illustrates a flowchart of method for streaming with latency minimization in accordance with one non-limiting aspect of the present invention.

FIG. 6 illustrates a flowchart 94 of method for streaming with latency minimization in accordance with one non-limiting aspect of the present invention. The processes and other operations associated with the method may be facilitated with one or more of the client 14 and/or the server 12 having a plurality of non-transitory instructions stored on a computer-readable medium, which when executed with a processor associated therewith, are sufficient to facilitate the processes necessary to optimize media streaming in the contemplated manner. The method contemplates controlling the client 14 to facilitate long polling or pre-availability polling of segment request messages and controlling the server 12 to facilitate processing of the request messages while awaiting availability of the corresponding segment(s). The method may be contrasted with the process associated with DASH at least in so-enabling clients 14 to issue request messages prior to timing specified in MPDs and/or enabling servers 12 to prevent or delay issuance (e.g., timeout) of not-found messages when segment requests are received prior to segment availability.

Block 96 relates to processing availability attributes associated with streaming services, such as but not necessarily limited to the availability attributes associated with the above-described MPD. The processing may include the server generating the availability attributes by formatting and otherwise generating metadata for media available therefrom as a function of information provided from a studio or other content source. The processing may also include the client retrieving the availability attributes from an MPD transmitted from the server or otherwise provided thereto for purposes of facilitating the latency minimization operations described herein, One non-limiting aspect of the present invention contemplates the client retrieving or otherwise accessing an MPD associated with media desired for streaming so as to identify segments requiring download and timing parameters associated with segment availability, i.e., when the server is indicated in the MPD as being available to transmit each segment. The segment availability may be determined by processing the availability attributes according to a segment availability time algorithm.

The segment availability algorithm may be sufficient for the client to associate an availability time with each of the segments of the desired media for purposes of requesting the download thereof. One non-limiting aspect of the present invention contemplates the segment availability algorithm being defined according to the above-describe attributes as follows:

Segment availability time=MPD@availabilityStartTime+(Period@startTime or the sum of previous Period@duration)+SegmentBase@availabilityTimeOffset+(number of previous segments MultipleSegmentBase@duration or sum of previous S@d (segment durations from segment timeline))/MultipleSegmentBase@timescale.

The segment availability algorithm may be extracted to generate the following time calculation options:
Option 1: Segment availability time=MPD@availabilityStartTime+(Period@startTime)+SegmentBase@availabilityTimeOffset+(number of previous segments*MultipleSegmentBase@duration)/MultipleSegmentBase@timescale;

Option 2: Segment availability time=MPD@availabilityStartTime+(the sum of previous Period@duration)+SegmentBase@availabilityTimeOffset+(number of previous segments*MultipleSegmentBase@duration)/MultipleSegmentBase@timescale;

Option 3: Segment availability time=MPD@availabilityStartTime+(Period@startTime)+SegmentBase@availabilityTimeOffset+(sum of previous S@d)/MultipleSegmentBase@timescale;

Option 4: Segment availability time=MPD@availabilityStartTime+(the sum of previous Period@duration)+SegmentBase@availabilityTimeOffset+(sum of previous S@d)/MultipleSegmentBase@timescale Wherein the availability attributes specify the MPD@availabilityStartTime, the SegmentBase@availabilityTimeOffset, the MultipleSegmentBase@duration, the MultipleSegmentBase@timescale and/or the Period@duration; and Wherein the client calculates the sum of previous Period@duration, the number of previous segments and/or the sum of previous S@

One exemplary calculation performed according to the segment availability time may be as follows:

```
<MPD type="dynamic"
availabilityStartTime="2016-04-19T00:00:00.0" ...>
    <Period id="1" start="PT0S">
        <!-- contents not important -->
    </Period>
    <Period id="2" start="PT30S">
        <AdaptationSet ...>
            <SegmentTemplate timescale="90000" duration="90000"
            startNumber="0" media="$Bandwidth$/$Number$.m4v">
            <!-- etc. -->
```

This example uses Option 1 with MPD@availabilityStartTime+Period@start+SegmentTemplate/MultipleSegmentBase@duration. If you want to know when segment 3 starts, the full calculation is:

2016-04-19+30 seconds+(90000/90000) seconds*2=2016:04:19T00:00:32 (32 seconds after the MPD's start time)

In this example, SegmentBase@availabilityTimeOffset wasn't given in the MPD, so it defaults to 0.

Block 98 relates to scheduling segment request messages to be transmitted from the client to request download from the server of the segments necessary to access the desired media. The scheduling may include the client identifying a segment availability time for each of the required segments and thereafter scheduling corresponding segment request messages to arrive at the server prior to the segment availability time. The scheduling may include the client calculating RTT, polling factors or other variables for use in adjusting the segment availability times for purposes of triggering transmission of corresponding segment request messages to arrive at the server before segment availability. The scheduling may also include pipelining or stacking request messages to enable segment downloading while additional request messages are simultaneously being transmitted to the server. Optionally, a bit rate, a quality metric or other feature of the attendant segment may be analyzed to determine download time/speed, bandwidth or other latency related variables affect messages timing or pipelining so as to ensure pre-availability arrival at the server.

Once timing of the segments is determined, and following a backoff or other adjustment thereto (e.g., long polling factor) to provide pre-availability arrival, the corresponding request messages request scheduling may include assigning or otherwise determining addressing, URLs or other information necessary to properly communicate the request from the client to the server. From the above example, the media="$Bandwidth$/$Number$.m4v" can be used to determine a segment URL by taking that string and replacing $Bandwidth$ with the value of Representation@bandwidth and replacing $Number$ with the segment number, starting at 0 or @startNumber (so in this case, @startNumber is completely superfluous). In short, the segment URLs for a representation at 20 Mbps would be:

20000000/0.m4v
20000000/1.m4v
etc.

And the URLs for a representation at 5 Mbps would be:
5000000/0.m4v
5000000/1.m4v
etc.

(This would also depend on any <SegmentBase> elements but the example doesn't have any)

Optionally, a SegmentTemplate could be similarly used, e.g., media="$Number$.m4v" to facilitate identifying filenames or other identifiers for the segments—"0.m4v", "1.m4v", etc.

Block 100 relates to instructing, configuring or otherwise controlling the server to process segment request messages arriving prior to availability of the corresponding segment. When operating according to DASH, the waiting process may include the server taking no action or at least avoiding issuance of a not-found message that the server would otherwise issue according to DASH if not configured in accordance with the present invention. Optionally, the waiting process may include the server executing one or more looping operations to check for availability of the requested segment and/or executing a timeout counter before issuing the not-found message if the segment is unavailable before the expiration thereof. Another option may be to configure or otherwise control the server operating system with registers or an event handler operable with the library so that it can be immediately notified when the file appears. Block 102 relates to the server transmitting a requested segment in a response message upon determining availability. One non-limiting aspect of the present invention contemplates transmitting the segment response messages as soon as the corresponding segments are available at the server, which given the pre-availability of the corresponding request messages, may optionally be completed in less time than it would take for the request message to travel from the client to the server if issued at a clock time matching the availability time, e.g., less than the current RTT.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for minimizing latency when streaming a media content component according to Dynamic Adaptive Streaming over HTTP (DASH) comprising:

determining availability attributes associated with one or more of a plurality of segments forming the media content component, the availability attributes indicating when corresponding ones of the plurality of segments are available for transmission from a server configured to stream the media content component to a client using Hypertext Transfer Protocol (HTTP);

facilitating a first segment request associated with requesting transmission of a first segment of the plurality of segments from the server to the client prior to the availability attributes associated therewith indicating the first segment to be available for transmission; and transmitting the first segment request from the client at a first instance in time occurring prior to a second instance in time associated with the availability attributes indicating the first segment to be available for transmission from the server, thereby facilitating long polling of the server for the first segment so as to minimize latency associated with the streaming thereof by performing calculations and corresponding communications on a segment-by-segment basis dependent on segment availability.

2. The method of claim 1 further comprising transmitting the first segment request with a timeout attribute, the timeout attribute specifying a maximum length of time for the server to wait for the first segment to become available for transmission prior to transmitting a not-found message to the client.

3. The method of claim 2 further comprising:
receiving the not-found message at the client at a third instance in time occurring prior to the second instance; and
re-transmitting the first segment request from the client after the third instance to request transmission of the first segment.

4. The method of claim 1 further comprising scheduling transmission of the first segment request from the client at the first instance according to a segment availability time calculated for the first segment, the segment availability time being derived from the availability attributes indicating a Coordinated Universal Time (UTC) value or a wall-clock value sufficient to indicate when the first segment will be available from the server to ensure the first segment request arrives at the server prior to the second instance.

5. The method of claim 4 further comprising determining the availability attributes from a media presentation descriptor (MPD) transmitted from the server to facilitate streaming of the media content component.

6. The method of claim 4 further comprising:
determining a round-trip time (RTT) for the first segment request to travel from the client to the server; and
calculating the first instance to occur at least the RTT before the segment availability time.

7. The method of claim 6 further comprising adding a long-polling factor to the RTT such that the first instance occurs more than the RTT before the segment availability time.

8. The method of claim 1 further comprising:
checking a library of the server for the first segment at a third instance in time occurring after the first instance and prior to the second instance;
determining the first segment to be unavailable in the library at the third instance in time;
determining the first segment to be available in the library at a fourth instance in time occurring after the third instance; and transmitting the first segment from the server to the client at a fifth instance in time occurring after the fourth instance.

9. The method of claim 8 further comprising executing a looping operation at the sever to determine the first segment to be available at the fourth instance such that the fourth instance occurs after the second instance.

10. The method of claim 9 further comprising:
determining a round-trip time (RTT) for the first segment request to travel from the client to the server; and
executing the looping operation such that the fourth instance occurs less than the RTT after the second instance.

11. The method of claim 10 further comprising executing the looping operation such that the fifth instance occurs less than the RTT after the second instance.

12. The method of claim 8 further comprising transmitting the first segment from the server to the client without transmitting a not-found message between the first instance and the fifth instance.

13. The method of claim 8 further comprising transmitting a not-found message from the server to the client at a sixth instance in time occurring after the second and third instances and prior to the fourth instance.

14. A non-transitory computer-readable medium having a plurality of instructions, which when executed with a processor associated with a client, minimize latency when streaming media from a server, the instructions being sufficient for:

determining availability attributes associated with a first segment of a plurality of segments forming the media, the availability attributes indicating when the first segment is available for transmission from the server and a first address for addressing a first segment request to the server for requesting transmission of the first segment;

transmitting the first segment request associated with requesting transmission of the first segment from the client to the first address at a first instance in time occurring prior to a second instance in time associated with the availability attributes indicating the first segment to be available for transmission from the server, thereby facilitating long polling of the server for the first segment so as to minimize latency associated with the streaming thereof by performing calculations and corresponding communications on a segment-by-segment basis dependent on segment availability;

prior to the client receiving availability attributes indicating a second address associated with a second segment of the plurality of segments, predicting the second address for the second segment from the availability attributes associated with the first segment, the second address being different than the first address and omitted from the availability attributes associated with the first segment; and transmitting a second segment request associated with requesting transmission of the second segment from the client to the second address at a third instance in time.

15. The non-transitory computer-readable medium of claim 14 wherein the instructions are sufficient for:
prior to the client receiving availability attributes indicating the second segment being available from the server at a fourth instance in time, predicting the fourth instance from the availability attributes associated with the first segment; and
transmitting the second segment request from the client to the second address at the third instance such that the third instance occurs before the fourth instance, thereby facilitating long polling of the server for the second segment so as to minimize latency associated with the streaming thereof.

16. The non-transitory computer-readable medium of claim 14 wherein the instructions are sufficient for:
   determining the second instance from the availability attributes associated with the first segment; and
   calculating the first instance by adjusting the second instance according to a long-polling factor.

17. The non-transitory computer-readable medium of claim 16 wherein the instructions are sufficient for determining the long-polling factor from the availability attributes associated with the first segment.

18. The non-transitory computer-readable medium of claim 16 wherein the instructions are sufficient for:
   determining a round-trip time (RTT) for messaging between the client and the server; and
   calculating the first instance to occur at least the RTT before the second instance.

19. A non-transitory computer-readable medium having a plurality of non transitory instructions, which when executed with a processor associated with a server, minimize latency when streaming media therefrom, the instructions being sufficient for:
   receiving at a first instance in time a first segment request associated with a client requesting transmission of a first segment of a plurality of segments forming the media, the first instance occurring prior to a second instance in time associated with the first segment being available for transmission from the server, the first segment request including a timeout attribute indicating a first time period following receipt of the first segment request the server is to wait for the first segment to become available for transmission;
   transmitting the first segment to the client in response to receipt of the first segment request when the second instance occurs within the first time period; and
   transmitting a not-found message to the client in response to receipt of the first segment request when the second instance fails to occur within the first time period.

20. The non-transitory computer-readable medium of claim 19 wherein the instructions are sufficient for:
   receiving a second segment request associated with the client requesting transmission of the first segment after the client receives the not-found message, the second segment request including the timeout attribute indicating a second time period following receipt of the first segment request the server is to wait for the first segment to become available for transmission, the second time period being longer than the first time period;
   transmitting the first segment to the client in response to receipt of the second segment request when the second instance occurs within the second time period; and
   transmitting the not-found message to the client in response to receipt of the second segment request when the second instance fails to occur within the first time period.

* * * * *